United States Patent
Hawaka

(10) Patent No.: US 10,680,668 B2
(45) Date of Patent: Jun. 9, 2020

(54) ELECTRONIC APPARATUS

(71) Applicant: LENOVO (SINGAPORE) PTE. LTD., Singapore (SG)

(72) Inventor: Shigekazu Hawaka, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/107,279

(22) Filed: Aug. 21, 2018

(65) Prior Publication Data
US 2019/0393911 A1    Dec. 26, 2019

(30) Foreign Application Priority Data
Jun. 22, 2018   (JP) ................. 2018-119191

(51) Int. Cl.
*H01Q 1/22*   (2006.01)
*H04B 1/10*   (2006.01)
*H04B 15/00*   (2006.01)

(52) U.S. Cl.
CPC ......... *H04B 1/1009* (2013.01); *H01Q 1/2266* (2013.01); *H04B 15/00* (2013.01)

(58) Field of Classification Search
CPC .... H01Q 1/2266; H01Q 1/243; H04B 1/1009; H04B 15/00
See application file for complete search history.

(56) References Cited

U.S. PATENT DOCUMENTS

| | | | | |
|---|---|---|---|---|
| 2005/0285804 A1* | 12/2005 | Usui | ............. | G06F 1/1616 343/702 |
| 2009/0073059 A1* | 3/2009 | Ikegaya | ............. | H01Q 1/2266 343/702 |
| 2013/0050031 A1 | 2/2013 | Zhu | | |
| 2013/0207855 A1* | 8/2013 | Chien | ............. | H01Q 9/42 343/721 |
| 2017/0222299 A1* | 8/2017 | Chiu | ............. | H01Q 1/48 |

FOREIGN PATENT DOCUMENTS

| | | |
|---|---|---|
| CN | 104756317 A | 7/2015 |
| JP | 200613797 A | 1/2006 |
| JP | 2013165409 A | 8/2013 |
| JP | 2014-211765 A | 11/2014 |
| WO | 2015022859 A1 | 2/2015 |

* cited by examiner

*Primary Examiner* — Dameon E Levi
*Assistant Examiner* — Hasan Z Islam
(74) *Attorney, Agent, or Firm* — Shimokaji IP

(57) ABSTRACT

An electronic apparatus includes: a chassis in which a display device is housed; a noise eliminating layer that is positioned between the chassis and the display device, and eliminates noise emitted from the display device; and an antenna for wireless communication that is housed in the chassis, in which the noise eliminating layer has a main body area and an auxiliary antenna area that extends from the main body area to the antenna and assists wireless communication of the antenna, and a portion of the auxiliary antenna area between one end on the side of the antenna and the other end on the side opposite to the one end is spaced apart from the main body area.

4 Claims, 5 Drawing Sheets

ELECTRONIC APPARATUS

FIELD OF THE INVENTION

The present invention relates to an electronic apparatus.

BACKGROUND OF THE INVENTION

Conventionally, a laptop personal computer (hereinafter, referred to as "laptop PC") is equipped with antennas used for wireless communication, such as a wireless WAN antenna and a wireless LAN antenna. These antennas are generally mounted in an upper part of a display chassis that houses a display (for example, Japanese Unexamined Patent Application Publication No. 2014-211765). Furthermore, the laptop PC may be equipped with a camera module. Since the camera module is mounted roughly in the center of the upper part of the display chassis, the antennas used for wireless communication are positioned so as to sandwich the camera module between them.

SUMMARY OF THE INVENTION

In recent years, some laptop PCs are equipped with a large module including an infrared (IR) camera or the like. In such laptop PCs, to secure a space to mount the module in a display chassis, antennas may be miniaturized. However, in a case where antennas are miniaturized, the performance of receiving radio waves at a specific frequency may decrease.

Accordingly, the present invention is intended to provide an electronic apparatus that include an antenna having high reception performance.

An electronic apparatus according to an aspect of the present invention includes: a chassis in which a display device is housed; a noise eliminating layer that is positioned between the chassis and the display device, and eliminates noise emitted from the display device; and an antenna for wireless communication that is housed in the chassis, in which the noise eliminating layer has a main body area and an auxiliary antenna area that extends from the main body area to the antenna and assists wireless communication of the antenna, and a portion of the auxiliary antenna area between one end on the side of the antenna to the other end on the side opposite to the one end is spaced apart from the main body area.

According to this aspect, the auxiliary antenna area of the noise eliminating layer that serves as an auxiliary antenna that assists wireless communication of the antenna. Therefore, even in a case where the antenna is miniaturized, the reception performance can be kept high.

An electronic apparatus according to another aspect of the present invention includes: a chassis in which a display device is housed; a noise eliminating layer that is positioned between the chassis and the display device, and eliminates noise emitted from the display device; an antenna for wireless communication that is housed in the chassis; and an electric conductor that is provided facing the antenna, and a portion of the electric conductor overlaps with the noise eliminating layer in a plan view and is connected to the noise eliminating layer, in which a portion of the electric conductor on the side of the antenna is spaced apart from the noise eliminating layer, and configures an auxiliary antenna area that assists wireless communication of the antenna in a low-frequency range.

According to this aspect, the electric conductor serves as an auxiliary antenna that assists wireless communication of the antenna. Therefore, even in a case where the antenna is miniaturized, the reception performance can be kept high.

The above-described aspects of the present invention can provide an electronic apparatus that includes an antenna having high reception performance.

DETAILED DESCRIPTION OF THE INVENTION

Figure 1:
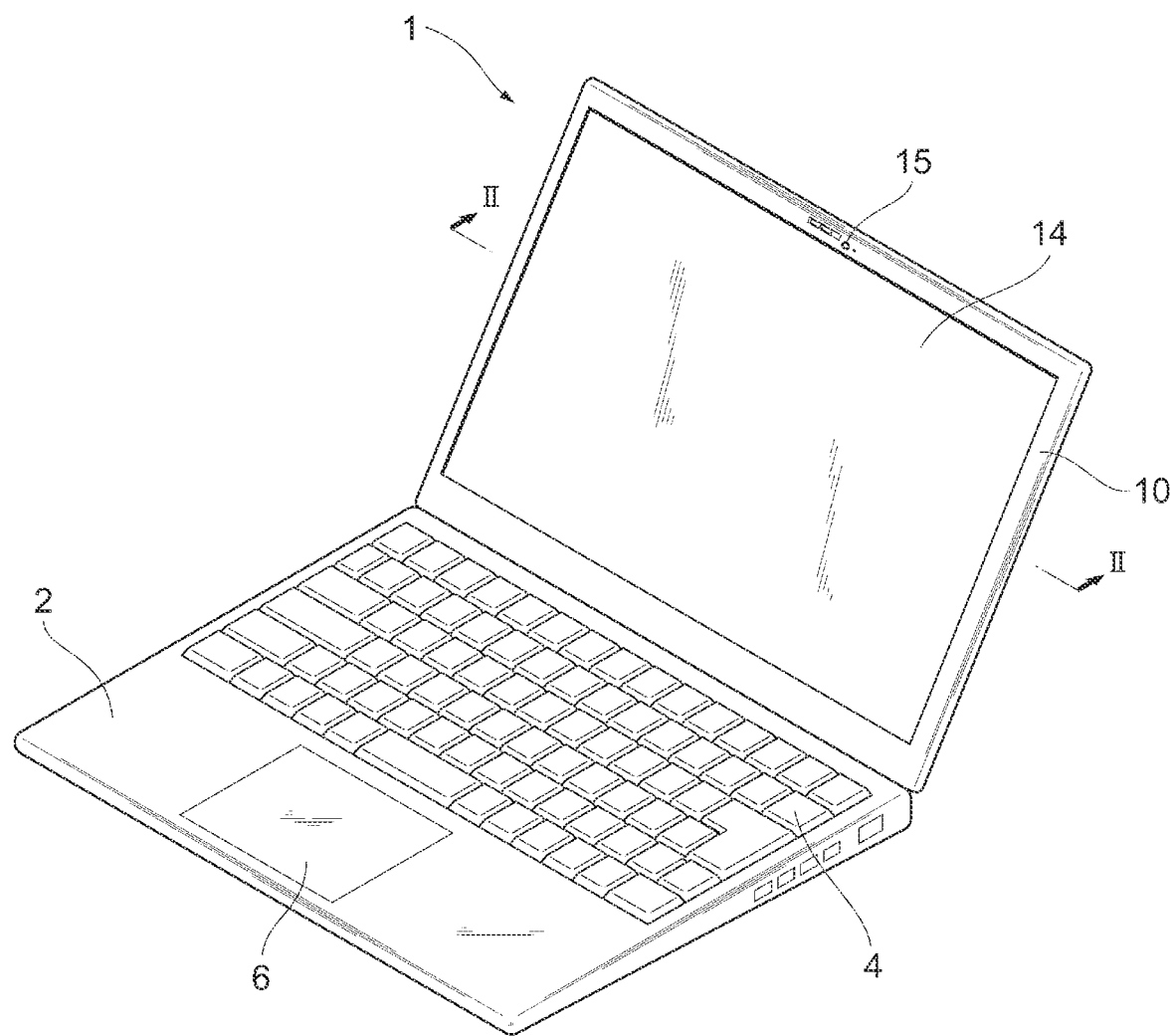
FIG. 1 is a diagram showing a laptop PC according to a first embodiment.

Embodiments of the present invention will be described with reference to accompanying drawings. Incidentally, in the drawings, components assigned the same reference numeral have the same or similar configuration.

The present invention can be applied to various electronic apparatuses, such as a laptop PC and a tablet PC. In this specification, there is described an example where the present invention is applied to a laptop PC.

First Embodiment

FIG. 1 is a perspective view showing a laptop PC 1. A configuration of the laptop PC 1 is described with reference to FIG. 1. The laptop PC 1 includes a main body 2 and a display chassis 10. The main body 2 and the display chassis 10 are rotatably connected by a hinge (not shown). That is, the display chassis 10 can be opened and closed with respect to the main body 2. FIG. 1 depicts a state where the display chassis 10 is open with respect to the main body 2. Incidentally, in this specification, a side of the display chassis 10 that is connected to the main body 2 is described as a lower part, and an opposite side is described as an upper part.

The main body 2 is made of a material such as resin or metal, and has a flat box shape. Inside the main body 2, a circuit board, a CPU, a memory, an HDD, a battery, etc. that are not illustrated are housed. The main body 2 is provided with a keyboard 4 so that key tops protrude from an upper surface of the main body 2. Furthermore, a touchpad 6 is provided adjacent to the keyboard 4. A user operates the laptop PC 1 through input units such as the keyboard 4 and the touchpad 6.

The display chassis 10 is made, in whole or in part, of a resin material such as carbon fiber reinforced plastic or glass fiber reinforced plastic, and houses a display 14 that is a display device. The display 14 is provided at a position facing the main body 2 in a state where the display chassis 10 is closed. The display 14 may be, for example, a liquid crystal display or an organic EL display. A display control circuit, etc. that control the display of the display 14 are housed, for example, in the display chassis 10.

Furthermore, a camera module is mounted in the display chassis 10, thus an image of a subject who is on the side of the display 14 can be taken through a hole 15 provided roughly in the center of an upper part of the display chassis 10.

Figure 2:
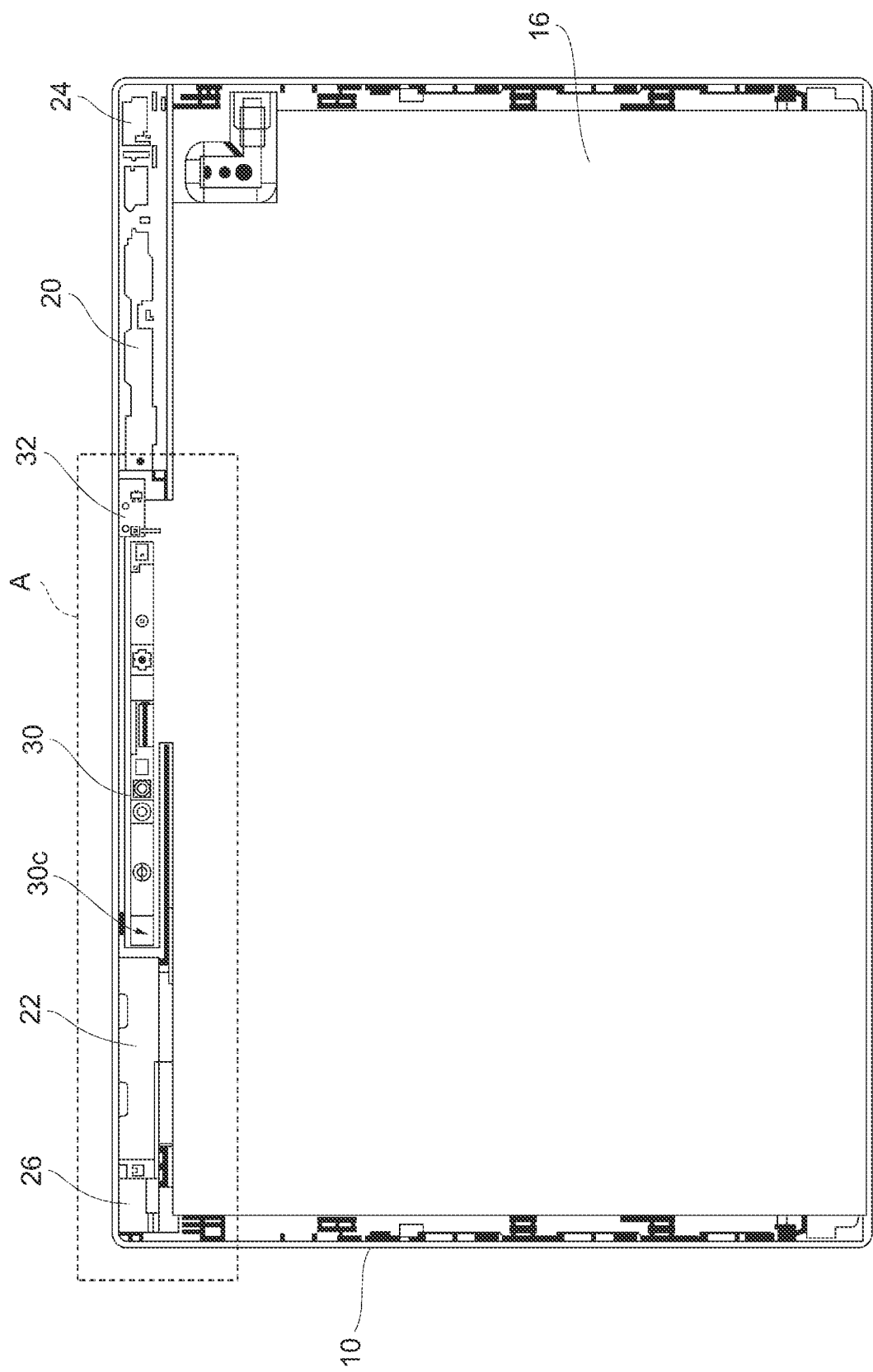
FIG. 2 is a cross-sectional view of a display chassis along a line II-II shown in FIG. 1.

FIG. 2 is a cross-sectional view of the display chassis 10 along a line II-II shown in FIG. 1. In other words, FIG. 2 is a diagram of the display chassis 10 with components (the display 14, etc.) positioned on the side of a user when the user uses the laptop PC 1 removed. An internal configuration of the display chassis 10 is described with reference to FIG. 2. The display chassis 10 includes a noise eliminating layer 16, a wireless WAN main antenna 20, a wireless WAN AUX antenna 22, a wireless LAN main antenna 24, a wireless LAN AUX antenna 26, a camera module 30, and a lid sensor 32.

Figure 3:
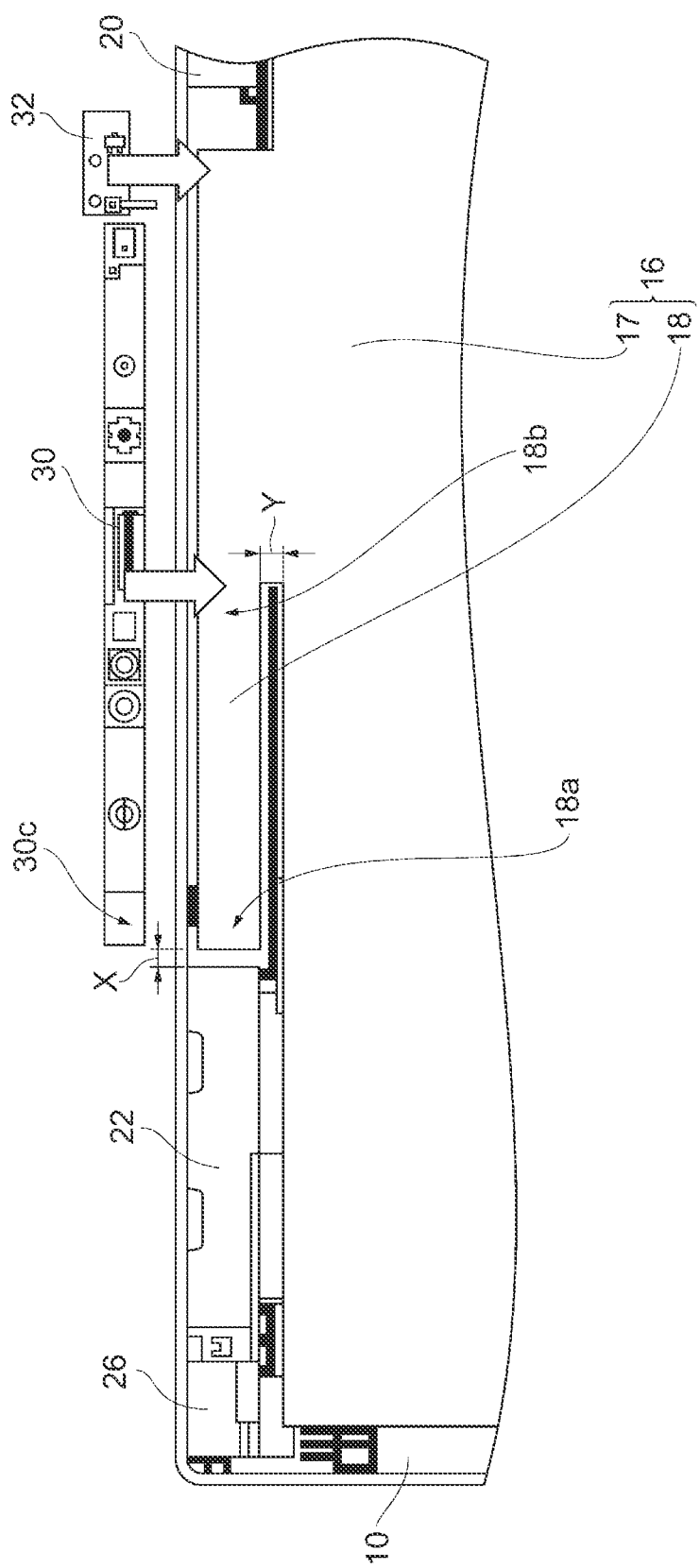
FIG. 3 is an enlarged view of a dashed area A shown in FIG. 2.

The noise eliminating layer 16 is a layered member positioned between the display chassis 10 and the display 14. As shown in FIG. 3, the noise eliminating layer 16 also extends between the display chassis 10 and the camera module 30. Electromagnetic waves (high-frequency noise), which cause a decrease in the reception performance of each antenna such as the wireless WAN main antenna 20, may be emitted from the display 14 and the camera module 30. The noise eliminating layer 16 serves as ground (GND) in the display chassis 10, and absorbs and eliminates the high-frequency noise emitted from the display 14 and the camera module 30.

The noise eliminating layer 16 may be formed, for example, by vapor deposition of a metallic material directly onto an inner surface of the display chassis 10. Furthermore, the noise eliminating layer 16 may be formed of a metal sheet, such as an aluminum sheet or a copper sheet.

The wireless WAN main antenna 20 and the wireless WAN AUX antenna 22 are antennas for a wireless WAN; the wireless WAN main antenna 20 performs transmission and reception of radio waves, and the wireless WAN AUX antenna 22 performs only reception of radio waves. The wireless WAN main antenna 20 and the wireless WAN auxiliary AUX 22 are mounted in the upper part of the display chassis 10 so as to sandwich the camera module 30 between them.

The wireless LAN main antenna 24 and the wireless LAN AUX antenna 26 are antennas for a wireless LAN, and perform transmission and reception of radio waves. The wireless LAN main antenna 24 and the wireless LAN AUX antenna 26 are mounted in both ends of the upper part of the display chassis 10, respectively.

The camera module 30 is a device for taking an image of a subject who is on the side of the display 14 through the hole 15 shown in FIG. 1. The camera module 30 is mounted roughly in the center of the upper part of the display chassis 10. The camera module 30 may include an RGB camera or an IR camera.

The lid sensor 32 is a sensor that detects opening and closing of the display chassis 10, and is mounted in the upper part of the display chassis 10. The lid sensor 32 is positioned between the camera module 30 and the wireless WAN main antenna 20.

FIG. 3 is an enlarged view of a dashed area A shown in FIG. 2. An auxiliary antenna area 18 that the noise eliminating layer 16 has is described with reference to FIG. 3. The noise eliminating layer 16 has a main body area 17 and the auxiliary antenna area 18.

The main body area 17 is an area of the noise eliminating layer 16 where the display 14 and a right-hand portion of the camera module 30 are stacked, and absorbs high-frequency noise emitted from the display 14 and the camera module 30.

The auxiliary antenna area 18 is an area extending from the main body area 17 to the wireless WAN AUX antenna 22. The auxiliary antenna area 18 is positioned on a line with an area where the wireless WAN AUX antenna 22 is housed.

A portion of the auxiliary antenna area 18 between one end 18a on the side of the wireless WAN AUX antenna 22 and the other end 18b on the side opposite to the one end 18a is spaced apart from the main body area 17 and forms a gap Y. As the auxiliary antenna area 18 has the above-described form, when the wireless WAN AUX antenna 22 has received radio waves, electric current flows through not only the wireless WAN AUX antenna 22 but also the auxiliary antenna area 18. That is, the auxiliary antenna area 18 serves as an auxiliary antenna that assists wireless communication of the wireless WAN AUX antenna 22. The length between the ends 18a and 18b of the auxiliary antenna area 18 is formed to be a length that allows radio waves in a low-frequency range to be received.

Incidentally, in a case where the camera module 30 includes an electric conductor, electric current flows through the camera module 30 stacked on the noise eliminating layer 16 as well. That is, the camera module 30 is electrically connected to the noise eliminating layer 16, and serves as an auxiliary antenna that assists wireless communication of the wireless WAN AUX antenna 22 along with the auxiliary antenna area 18. Therefore, the auxiliary antenna area 18 may be formed so that its one end 18a is positioned farther from the wireless WAN AUX antenna 22 than one end 30c of the camera module 30 on the side of the wireless WAN AUX antenna 22 in a front view in FIG. 2.

The one end 18a of the auxiliary antenna area 18 on the side of the wireless WAN AUX antenna 22 is spaced apart from the wireless WAN AUX antenna 22, and a gap X is provided between the auxiliary antenna area 18 and the wireless WAN AUX antenna 22. By providing the gap X, mutual interference of the wireless WAN AUX antenna 22 and the auxiliary antenna area 18 is prevented, and therefore, it is possible to prevent a decrease in the performance of receiving radio waves.

The auxiliary antenna area 18 in the present embodiment extends from an upper part of the main body area 17 to the left side (the side of the wireless WAN AUX antenna 22), and assists wireless communication of the wireless WAN AUX antenna 22. However, an antenna that the auxiliary antenna area 18 assists is not limited to the wireless WAN AUX antenna 22; alternatively, the auxiliary antenna area 18 may be configured to assist wireless communication of another antenna. For example, in a case where the auxiliary antenna area 18 assists wireless communication of the wireless WAN main antenna 20, the auxiliary antenna area 18 may be configured to extend from the upper part of the main body area 17 to the right side (the side of the wireless WAN main antenna 20).

Figure 4:
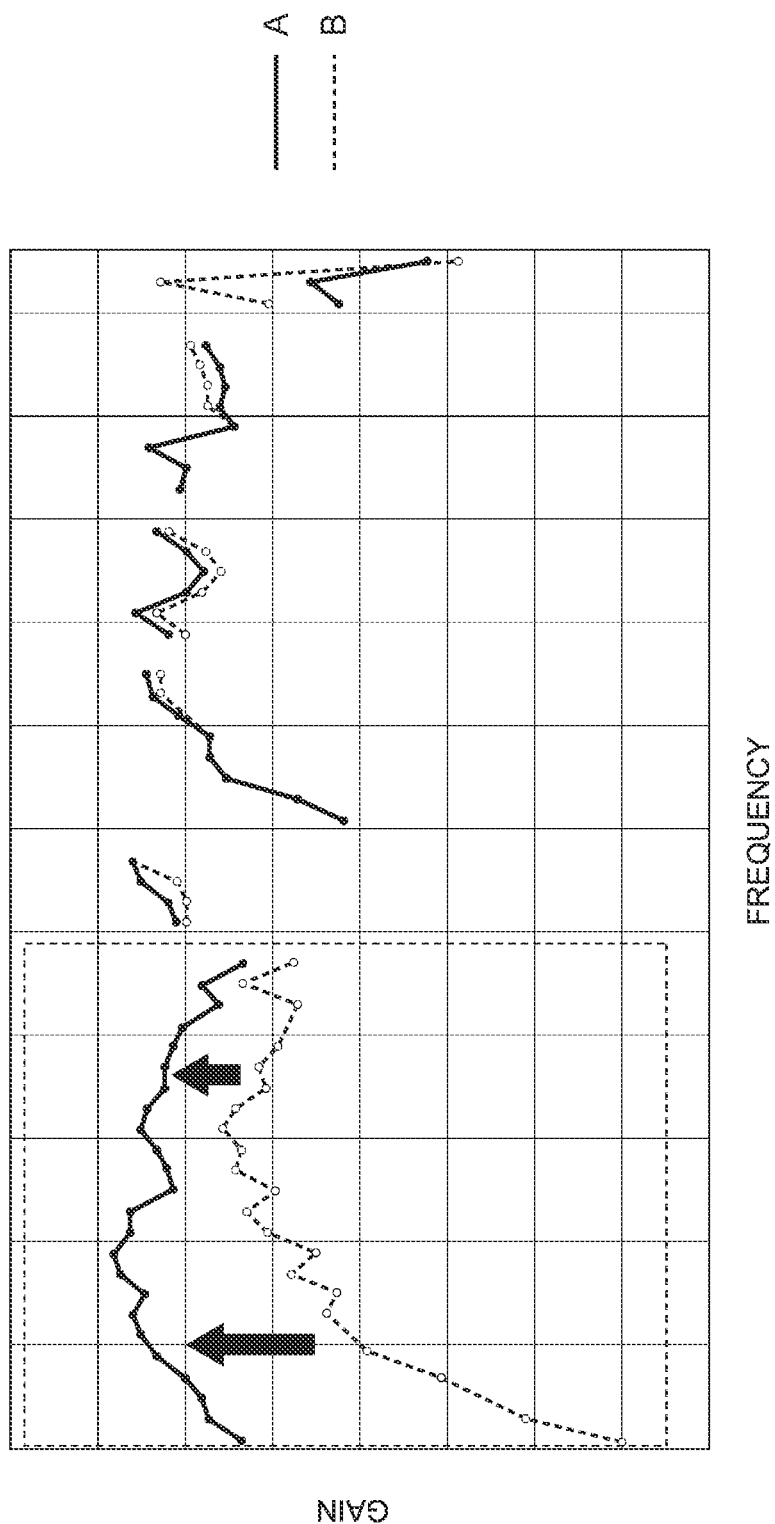
FIG. 4 is a graph showing the gain of an antenna mounted in the laptop PC according to the first embodiment.

FIG. 4 is a graph showing a relationship between the frequency of radio waves received by the wireless WAN AUX antenna 22 and the gain of the wireless WAN AUX antenna 22. The horizontal axis of the graph indicates a frequency of radio waves; the value of frequency increases towards the right on the horizontal axis. On the other hand, the vertical axis of the graph indicates the gain of the wireless WAN AUX antenna 22; the value of gain and the performance of receiving radio waves increase towards up on the vertical axis.

FIG. 4 depicts two graphs: a graph A and a graph B. The graph A shows the gain in a case where the laptop PC 1 having the auxiliary antenna area 18 according to the present embodiment is equipped with the wireless WAN AUX antenna 22; the graph B shows the gain in a case where a conventional laptop PC not having the auxiliary antenna area 18 is equipped with the wireless WAN AUX antenna 22.

In a dashed area on the left side of the graph, the gain shown by the graph A is largely shifted upward as compared with the gain shown by the graph B. That is, it can be seen that as compared with the wireless WAN AUX antenna 22 mounted in the conventional laptop PC, the wireless WAN AUX antenna 22 mounted in the laptop PC 1 having the auxiliary antenna area 18 according to the present embodiment shows the improved performance of receiving radio waves in a low-frequency range.

A frequency range of radio waves intended to be improved in the reception performance can be selected by adjusting the length of the auxiliary antenna area 18. Specifically, the longer the length from the one end 18a to the other end 18b of the auxiliary antenna area 18 shown in FIG. 3 is, the higher the performance of receiving radio waves in a low-frequency range is improved; the shorter the length, the higher the performance of receiving radio waves in a high-frequency range is improved. In the present embodiment, the length of the auxiliary antenna area 18 is adjusted to improve the performance of receiving radio waves in the low-frequency range (about 700 MHz to about 1000 MHz).

In the laptop PC 1 according to the present embodiment, the auxiliary antenna area 18 of the noise eliminating layer 16 serves as an auxiliary antenna that assists wireless communication of the wireless WAN AUX antenna 22. Therefore, even in a case where the wireless WAN AUX antenna 22 is miniaturized, the performance of receiving radio waves can be kept high.

Furthermore, by miniaturizing the wireless WAN AUX antenna 22, a space to mount other modules can be sufficiently secured in the display chassis 10. That is, it is possible to mount a large module, such as an IR camera, in the display chassis 10.

Second Embodiment

Figure 5:
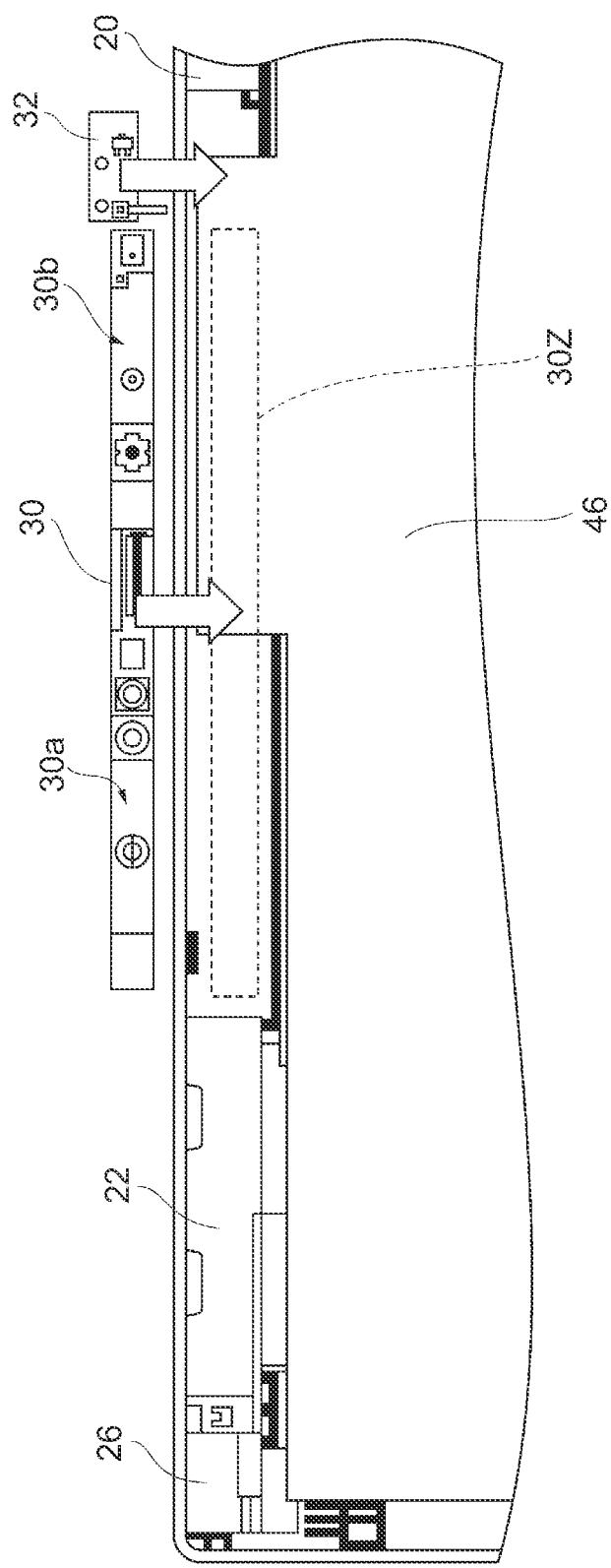
FIG. 5 is a diagram showing an internal configuration of a laptop PC according to a second embodiment.

FIG. 5 is a diagram showing an internal configuration of a laptop PC according to a second embodiment of the present invention. Just like FIG. 3, FIG. 5 is a diagram of the display chassis 10 with components (the display 14, etc.) positioned on the side of a user when the user uses the laptop PC removed. A configuration of antennas included in the laptop PC according to the second embodiment is described with reference to FIG. 5.

The laptop PC according to the second embodiment includes a noise eliminating layer 46, just like the laptop PC 1 according to the first embodiment. However, the laptop PC according to the second embodiment differs from the laptop PC 1 according to the first embodiment in that the noise eliminating layer 46 does not have an area corresponding to the auxiliary antenna area 18 in the first embodiment and has only an area corresponding to the main body area 17. Except for the above, the laptop PC according to the second embodiment has a configuration similar to the laptop PC 1 according to the first embodiment.

The camera module 30 is mounted in a dashed area 30Z of the display chassis 10 shown in FIG. 5. In a state where the camera module 30 is mounted in the display chassis 10, a portion (a first portion 30a) of the camera module 30 on the side of the wireless WAN AUX antenna 22 is spaced apart from the noise eliminating layer 46.

On the other hand, a portion (a second portion 30b) of the camera module 30 on the side opposite to the first portion 30a is positioned to overlap with the noise eliminating layer 46 in a plan view. Furthermore, a substrate of the camera module 30 is formed of an electric conductor, and the second portion 30b is electrically connected to the noise eliminating layer 46.

In a state where the camera module 30 is mounted in the display chassis 10, when the wireless WAN AUX antenna 22 receives radio waves, electric current flows through not only the wireless WAN AUX antenna 22 but also the first portion 30a of the camera module 30. That is, the first portion 30a of the camera module 30 configures an auxiliary antenna area that assists wireless communication of the wireless WAN AUX antenna 22.

In the laptop PC according to the present embodiment, the first portion 30a of the camera module 30 on the side of the wireless WAN AUX antenna 22 serves as an auxiliary antenna that assists wireless communication of the wireless WAN AUX antenna 22. Therefore, even in a case where the wireless WAN AUX antenna 22 is miniaturized, the performance of receiving radio waves can be kept high.

Furthermore, by miniaturizing the wireless WAN AUX antenna 22, a space to mount other modules can be sufficiently secured in the display chassis 10. That is, it is possible to mount a large module, such as an IR camera, in the display chassis 10.

Incidentally, the electric conductor that is stacked on the noise eliminating layer 46 and serves as an auxiliary antenna is not limited to a camera module, and may be a module including, for example, a microphone or a speaker.

The embodiments described above are intended to facilitate understanding of the present invention, and are not intended to interpret the present invention in a limited way. Respective components included in the embodiments and their placement, material, condition, shape, size, etc. are not limited to those illustrated as an example, and can be modified accordingly. Furthermore, the components described in the different embodiments can be partially replaced or combined.

The invention claimed is:

1. An electronic apparatus, comprising:
   a chassis in which a display is housed;
   a camera module in the chassis;
   a noise eliminating ground layer is sandwiched between the chassis and the display, and eliminates noise emitted from the display; and
   an antenna for wireless communication and housed in the chassis,
   wherein the noise eliminating ground layer has a main body area and an auxiliary antenna area that extends from the main body area to the antenna and assists wireless communication of the antenna,
   the main body area is sandwiched between the chassis and the camera module,
   a portion of the auxiliary antenna area, between one end on a side of the antenna and another end on a side opposite to the one end, is spaced apart from the main body area,
   the portion of the auxiliary antenna area is sandwiched between the camera module and the chassis, and
   the camera module is electrically connected to the noise eliminating ground layer wherein the camera module operates as an auxiliary antenna.

2. The electronic apparatus according to claim 1, wherein the one end of the portion of the auxiliary antenna area on the side of the antenna is spaced apart from the antenna.

3. The electronic apparatus according to claim 1, wherein:
   the chassis has an antenna housing area in which the antenna is housed, and the antenna housing area is positioned on a line with the auxiliary antenna area.

4. The electronic apparatus according to claim 1, wherein the portion of the auxiliary antenna area, between the one end on the side of the antenna and the another end on the side opposite to the one end, is spaced apart from the main body area over a length that allows radio waves in a low-frequency range to be received.

\* \* \* \* \*